United States Patent
Zhu et al.

(10) Patent No.: US 12,292,419 B1
(45) Date of Patent: May 6, 2025

(54) DYNAMIC TRUE TRIAXIAL ELECTROMAGNETIC HOPKINSON BAR LEVELING AND CENTERING SYSTEM AND METHOD

(71) Applicant: Shenzhen University, Shenzhen (CN)

(72) Inventors: Jianbo Zhu, Shenzhen (CN); Shiwei Zhang, Shenzhen (CN); Heping Xie, Shenzhen (CN); Tao Zhou, Shenzhen (CN); Chengcheng Xie, Shenzhen (CN); Weiyue Bao, Shenzhen (CN); Zhuo Cen, Shenzhen (CN); Junyan Li, Shenzhen (CN); Linsheng Liang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/020,925

(22) Filed: Jan. 14, 2025

(30) Foreign Application Priority Data

May 10, 2024 (CN) .......................... 202410577511.3

(51) Int. Cl.
*G01N 3/62* (2006.01)

(52) U.S. Cl.
CPC ......... *G01N 3/62* (2013.01); *G01N 2203/005* (2013.01); *G01N 2203/0202* (2013.01); *G01N 2203/0256* (2013.01)

(58) Field of Classification Search
CPC .. G01N 3/02; G01N 3/18; G01N 3/36; G01N 3/08; G01N 3/307; G01N 3/38; G01N 3/12; G01N 3/62; G01N 2203/005; G01N 2203/0202; G01N 2203/0256; G01N 3/06; G01N 3/317; G01N 3/10; G01N 3/30; G01N 3/066; G01N 3/14; G01N 1/286; G01N 3/068; G01P 21/00; G01C 21/165; G01V 3/10
USPC .......................... 73/1.01, 789, 790, 813, 818
See application file for complete search history.

(56) References Cited

U.S. PATENT DOCUMENTS

2021/0318216 A1* 10/2021 Zhu .......................... G01N 3/36
2021/0325287 A1* 10/2021 Xie .......................... G01N 3/08

FOREIGN PATENT DOCUMENTS

| CN | 106154976 B | 11/2016 |
|---|---|---|
| CN | 109668775 B | 4/2019 |
| CN | 113092239 A | 7/2021 |
| CN | 214794249 U | 11/2021 |
| CN | 115575273 A | 1/2023 |
| CN | 116793885 A | 9/2023 |

* cited by examiner

*Primary Examiner* — Brandi N Hopkins
(74) *Attorney, Agent, or Firm* — Birchwood IP (57) ABSTRACT

Provided is a dynamic true triaxial electromagnetic Hopkinson bar leveling and centering system and method. The system comprises a supporting base, a micrometer adjusting knob, a sliding platform, an auxiliary supporting plate, a fixing groove, at least two auxiliary centering targets and a lamp source. According to the auxiliary centering system, a principle that light rays are straight lines and two points form one line is adopted, and adjacent perpendicularity and coaxial centering leveling of a bar piece are determined by respectively adjusting a center of a loading end surface of the bar piece and an upper surface of the bar piece.

9 Claims, 8 Drawing Sheets

DYNAMIC TRUE TRIAXIAL ELECTROMAGNETIC HOPKINSON BAR LEVELING AND CENTERING SYSTEM AND METHOD

CROSS-REFERENCE TO RELATED APPLICATIONS

This application claims priority to Chinese Patent Application No. 202410577511.3, filed on May 10, 2024, which is hereby incorporated by reference in its entirety.

TECHNICAL FIELD

The present invention relates to the field of high-end equipment manufacturing, and more particularly, to a bar piece accurate leveling and centering system and method based on a dynamic true triaxial electromagnetic Hopkinson bar system.

BACKGROUND

In geotechnical engineering activities, dynamic disturbance usually leads to dynamic disasters, but static stress loading and dynamic stress disturbance on a rock mass may be true triaxial state. At present, a Hopkinson bar system and a deformation device are usually used to test dynamic mechanics of rocks. Coaxial centering and leveling of bar pieces are always key factors for validity of experimental data, regardless of a uniaxial state or the true triaxial state. For six bar pieces in the true triaxial state, it is necessary to ensure that the adjacent bar pieces are axially perpendicular to each other while ensuring the coaxial centering and leveling of the bar pieces, which greatly increases difficulty of adjustment.

The present invention provides a device and method for facilitating loading and centering of a true triaxial Hopkinson bar system, which can level and center bar pieces, so that two coaxial bar pieces are centered with a sample and three adjacent bar pieces are perpendicular to each other, thus ensuring accuracy and dependability of a test result.

SUMMARY

The present invention aims at providing an accurate centering device and a use method thereof to ensure that coaxial bar pieces are centered and leveled, and adjacent bar pieces are perpendicular to improve a test efficiency and make a text result more reliable.

In order to solve the problems in the prior art, the present invention provides a dynamic true triaxial electromagnetic Hopkinson bar leveling and centering system, comprising a supporting base, a micrometer adjusting knob, a sliding platform, an auxiliary supporting plate, a fixing groove, at least two auxiliary centering targets and a lamp source, wherein the lamp source comprises an X+ lamp source, an X− lamp source, a Y+ lamp source, a Y− lamp source, a Z+ lamp source and a Z− lamp source, the six lamp sources are a whole structure, the adjacent lamp sources are perpendicular to each other and coaxially centered with each other; a side length of an inner cavity of the supporting base of the centering system is slightly larger than a size of the bar piece, and the lamp source is in free and non-fixed connection with the auxiliary supporting plate; and one end of the auxiliary supporting plate is placed in the fixing groove, the other end of the auxiliary supporting plate supports the X+ lamp source and the X− lamp source, and the sliding platform is driven to move by rotating the micrometer adjusting knob to adjust a height of the lamp source.

The present invention provides a dynamic true triaxial electromagnetic Hopkinson bar leveling and centering method, wherein the dynamic true triaxial electromagnetic Hopkinson bar leveling and centering system mentioned above is utilized to perform leveling and centering of the bar piece, comprising the following steps of:

Step 1: determining placing positions of bar pieces of a dynamic true triaxial electromagnetic Hopkinson bar testing system, and roughly placing six bars on a bar piece supporting frame according to a true triaxial stress loading state and a principle that adjacent bar pieces are perpendicular to each other and coaxial bar pieces are centered;

Step 2: determining a central point of the loading end surface of the bar piece;

Step 3: adjusting perpendicularity of a Z− direction bar piece;

Step 4: assembling the centering system, sheathing the supporting base of the centering system from a loading end surface of the Z− direction bar piece to stably contact with the end surface of the bar piece and fixing the supporting base of the centering system on the bar piece; and subsequently, installing the auxiliary supporting plate on the supporting base, and placing the X+ lamp source and the X− lamp source on a groove of the auxiliary supporting plate, thus ensuring levelness of the X-axis lamp source and the Y-axis lamp source and perpendicularity of the Z-axis lamp source after the lamp sources stop shaking;

Step 5: adjusting centering of the centering system: according to planes where an X-axis bar piece and a Y-axis bar piece are located, accurately controlling the sliding platform to slide synchronously by controlling the micrometer adjusting knob of the centering system to drive the auxiliary supporting plate to adjust the height of the lamp source, such that the X+ lamp source, the X− lamp source, the Y+ lamp source, the Y− lamp source and the Z+ lamp source are projected around the central point of the loading end surface of the bar piece, and the central point of the loading end surface of the bar piece coincides with a projection point of the laser lamp source by adjusting supporting structure of each bar piece; and Step 6: adjusting a height of the centering system: after the centering and the leveling of the X-axis and the Y-axis are completed, respectively placing the two auxiliary centering targets at a stress wave application end on an X+ direction bar piece and a loading end contacted with a sample, adjusting the sliding platform and the auxiliary supporting plate of the centering system by controlling the micrometer adjusting knob, adjusting the heights of the X+ lamp source and the X− lamp source, and projecting lamp source points to a central point D of the auxiliary centering target near the loading end of the bar piece, and then adjust up, down, left and right positions of the X+ direction bar piece by controlling the bar piece supporting frame to enable a laser beam to be projected to a central point G of the auxiliary centering target at the loading end of the bar piece through the central point D of the auxiliary centering target at the loading end of the bar piece, and fixing the X+ direction bar piece; and completing the leveling and centering of an X− direction bar piece, a Y+ direction bar piece and a Y− direction bar piece by using the same method;

wherein, perpendicularity of a Z+ direction bar piece is automatically adjusted according to a dead load of the Z+ direction bar piece as the Z+ direction bar piece is suspended on a loading framework of the dynamic true triaxial electromagnetic Hopkinson bar testing system, all-around positions of the Z+ direction bar piece are controlled by adjusting the bar piece supporting frame with the Z− direction bar piece as a reference, so that a central point of a loading end surface of the Z+ direction bar piece coincides with a projection point of the laser lamp, thus completing adjusting centering of the Z+ direction bar piece; and centering and leveling of a triaxial six-direction bar piece is completed according to the above method.

As a further improvement of the present invention, in Step 1, the loading end surface of the Z− direction bar piece is aligned with lower surfaces of the X-axis and Y-axis bar pieces, and the Z+ direction bar piece is suspended on the supporting framework of the dynamic true triaxial electromagnetic Hopkinson bar testing system to ensure the perpendicularity according to the dead load of the Z+ direction bar piece.

As a further improvement of the present invention, in Step 2, diagonal corners of the loading end surfaces of the six bar pieces are respectively connected, and an intersection point of the two diagonal lines is a central point of the end surfaces, and marked.

As a further improvement of the present invention, in Step 3, before installing and fixing the centering system, it is necessary to determine the perpendicularity of the Z− direction bar piece, wherein one plumb line is erected above the Z− direction bar piece, and naturally drops along the bar piece, points are taken downwards along the Z− direction bar piece according to upper, middle and lower directions, distances of points A, B and C from the plumb line are respectively measured with a micrometer, and the distances between the points A, B and C and the plumb line are within the same numerical range by adjusting the bar piece supporting frame of the Z− direction bar piece, thus, the perpendicularity adjustment of the Z− direction bar piece is completed and the bar piece is fixed.

As a further improvement of the present invention, in Step 5, the centering and leveling method of the X-axis and the Y-axis in a horizontal direction are as follows: taking the X-axis for example, when the X+ lamp source is at a center of an X-axis end surface, the bar piece supporting frame is adjusted to overlap a projection point of the X+ lamp source with a central point F of the loading end surface of the X+ direction bar piece, thus completing adjusting the centering of the loading end surface of the X+ direction bar piece.

As a further improvement of the present invention, in Step 5, the perpendicularity of the Z+ direction bar piece is adjusted according to the dead load of the Z+ direction bar piece first, then the all-around positions of the Z+ direction bar piece are adjusted according to the projection point of the Z+ lamp source and the central point of the end surface of the bar piece to make the Z+ direction bar piece correspond to a center of the Z− direction bar piece.

As a further improvement of the present invention, in Step 6, the two auxiliary centering targets are respectively placed on the stress wave application end and the loading end contacted with the sample.

As a further improvement of the present invention, in Step 6, a bottom width of the auxiliary centering target is consistent with a width of the bar piece.

As a further improvement of the present invention, two auxiliary centering targets are placed on each bar piece at the same time.

The present invention has the beneficial effects that:

(1) According to the auxiliary centering system, a principle that light rays are straight lines and two points form one line is adopted, and coaxial centering, coplanar leveling and adjacent perpendicularity of the bar piece are determined by respectively adjusting the center of the loading end surface of the bar piece and the upper surface of the bar piece.

(2) The auxiliary centering system can ensure the accurate leveling and centering of the true triaxial Hopkinson bar testing system before the test.

(3) The lamp source of the auxiliary centering system is adjustable, and the height of the lamp source can be accurately adjusted, and the accuracy can be controlled within 0.02 mm.

(4) It is ensured that the center of the bar piece is opposite and the surface of the bar piece is leveled and perpendicular, ensured that the sample is loaded by the combination of dynamic and static stresses in three mutually perpendicular directions, ensured that the bar piece is not damaged, and ensured the accuracy and reliability of the test structure.

Names of components in the drawing are as follows:

1 refers to X+ direction bar piece, 2 refers to X+ direction bar piece boss, 3 refers to X− direction bar piece, 4 refers to X− direction bar piece boss, 5 refers to Y+ direction bar piece, 6 refers to Y+ direction bar piece boss, 7 refers to Y− direction bar piece, 8 refers to Y− direction bar piece boss, 9 refers to Z+ direction bar piece, 10 refers to Z+ direction bar piece boss, 11 refers to Z− direction bar piece, 12 refers to Z− direction bar piece boss, 13 refers to supporting base, 14 refers to micrometer adjusting knob, 15 refers to sliding platform, 16 refers to fixing groove, 17 refers to auxiliary supporting plate, 18 refers to X+ lamp source, 19 refers to X− lamp source, 20 refers to Y+ lamp source, 21 refers to Y− lamp source, 22 refers to Z+ lamp source, 23 refers to Z− lamp source, 24 refers to auxiliary centering target, 25 refers to plumb line, 26 refers to guide rail, 27 refers to bar piece supporting frame, and 28 refers to adjusting screw.

DESCRIPTION OF EMBODIMENTS

The present invention is further explained with reference to the drawings hereinafter.

Figure 1:
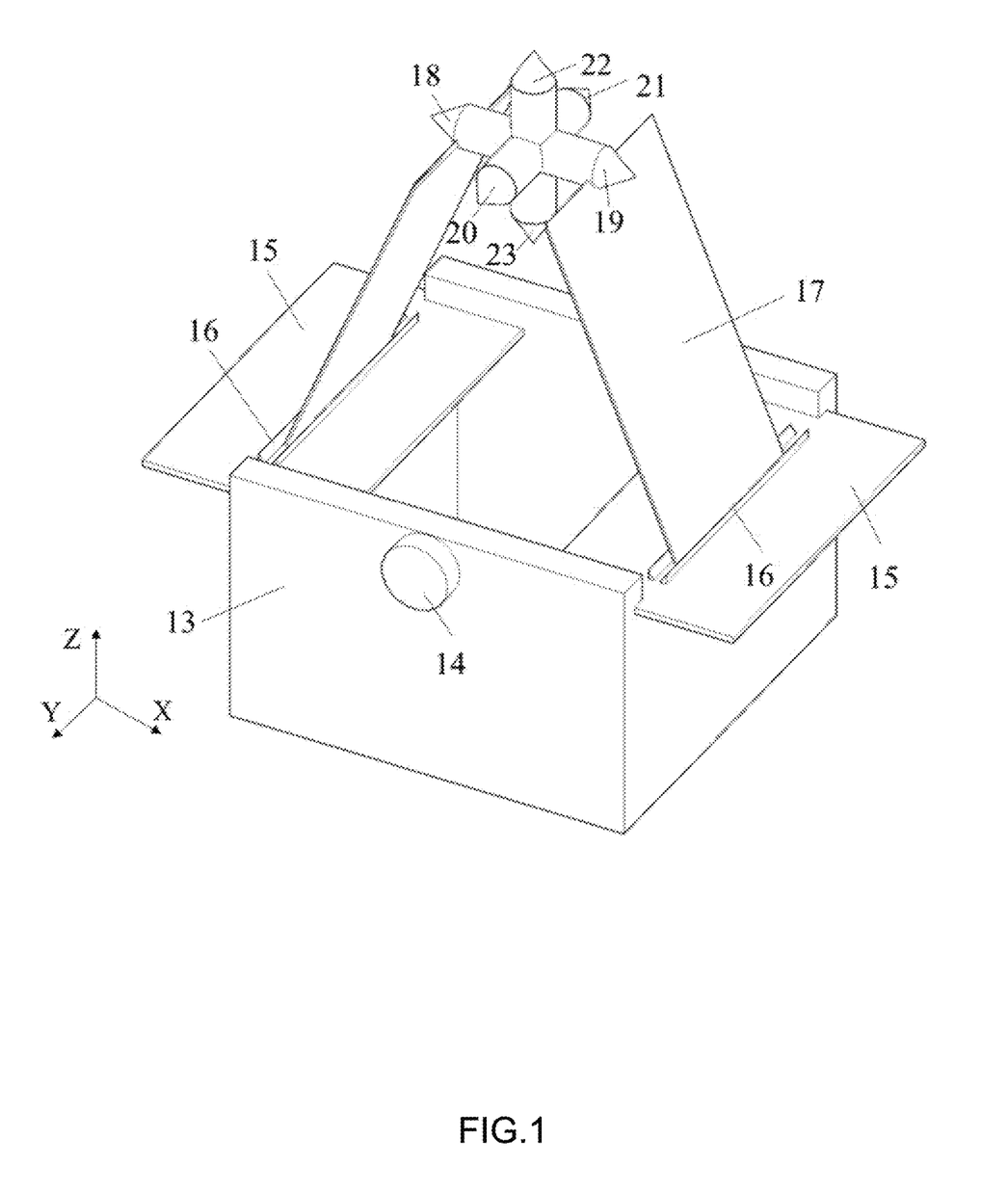
FIG. 1 is a structural feature diagram of an auxiliary centering system according to the present invention.
Figure 2:
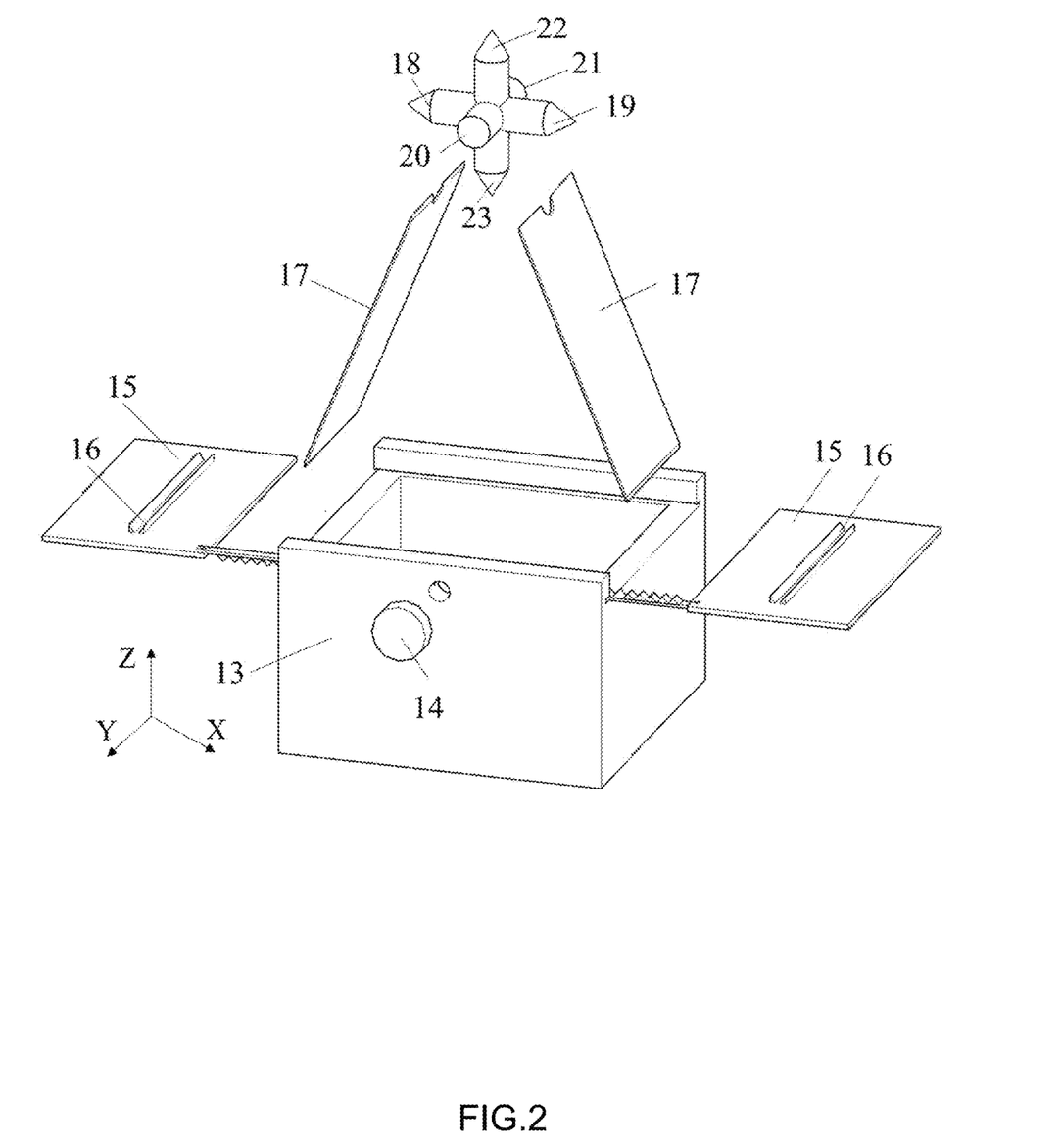
FIG. 2 is a structural decomposition feature diagram of the auxiliary centering system according to the present invention.
Figure 3:
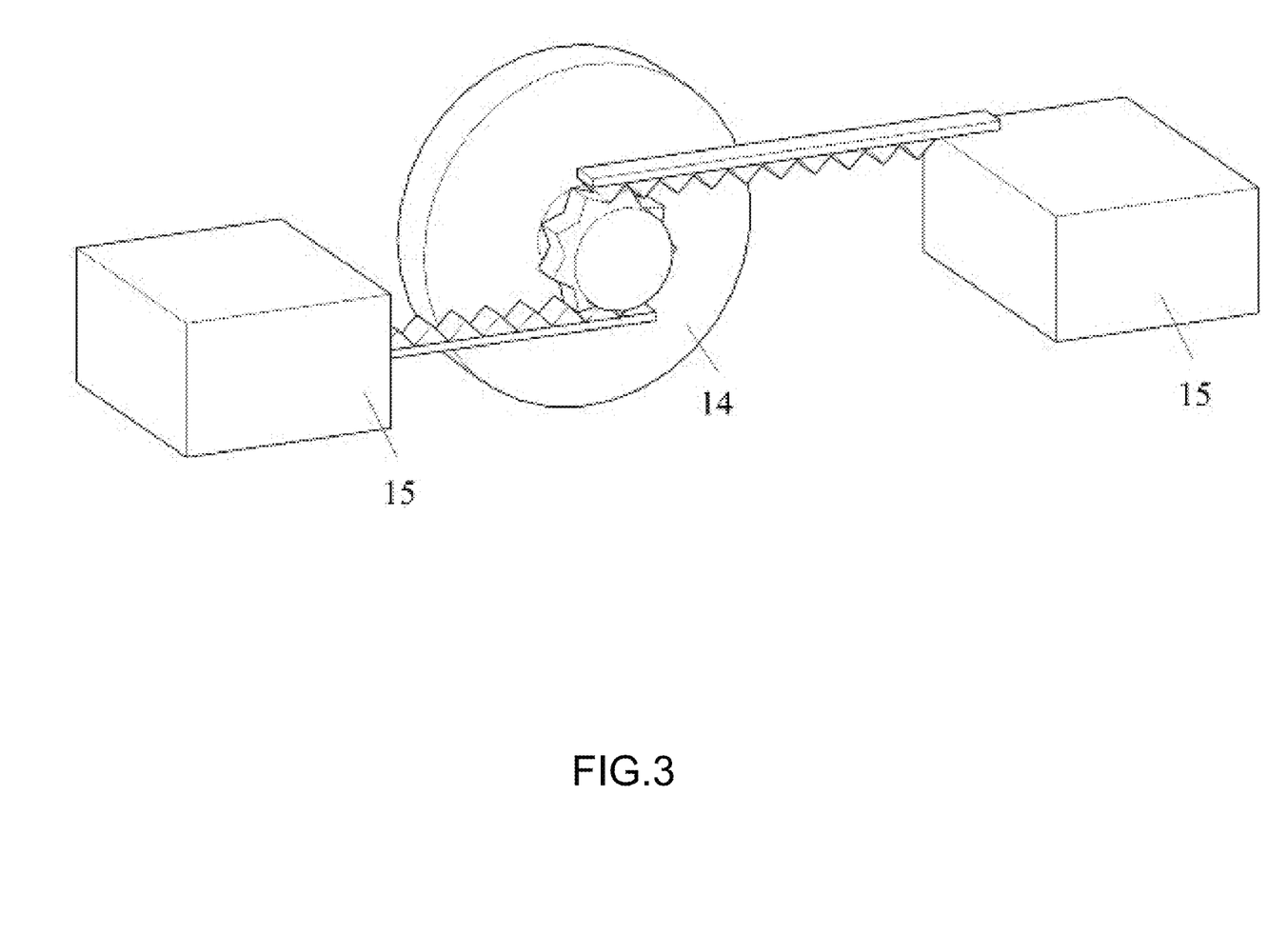
FIG. 3 is a schematic diagram of an adjusting principle of a micrometer adjusting knob according to the present invention.

Embodiment 1: a dynamic true triaxial electromagnetic Hopkinson bar leveling and centering system, as shown in FIG. 1 to FIG. 3, is applied to leveling and centering of bar pieces of a true triaxial Hopkinson bar testing system, which is safety guarantee for integrity of the bar pieces of the testing system and reliable experimental result.

The centering system comprises a supporting base 13, a micrometer adjusting knob 14, a sliding platform 15, an auxiliary supporting plate 17, a fixing groove 16, at least two auxiliary centering targets 24 and a lamp source. The lamp source comprises an X+ lamp source 18, an X− lamp source 19, a Y+ lamp source 20, a Y− lamp source 21, a Z+ lamp source 22 and a Z− lamp source 23, the six lamp sources are a whole structure, the adjacent lamp sources are perpendicular to each other and coaxially centered with each other. The lamp source is preferably a laser lamp source.

A side length of an inner cavity of the supporting base 13 of the centering system is slightly larger than a size of the bar piece, and the inner cavity of the supporting base 13 may be installed on a loading end of a Z− direction bar piece 11. The lamp source is in free and non-fixed connection with the auxiliary supporting plate 17.

The inner cavity of the supporting base 13 of the centering system may be directly sheathed on the Z− direction bar piece 11, that is, the supporting base 13 can just be sheathed on the Z− direction bar piece 11, for example, the side length of the inner cavity of the supporting base 13 is 50.2 mm, and the side length of the bar piece is 50 mm. One end of the auxiliary supporting plate 17 is placed in the fixing groove 16, and the other end of the auxiliary supporting plate 17 supports the X+ lamp source 18 and the X− lamp source 19. The sliding platform 15 is driven to move by rotating the micrometer adjusting knob 14 to adjust a height of the lamp source.

The centering system adopts a principle that light ray is a straight line, and emits adjacent perpendicular and coaxially centered laser beams from the same central point to six stress wave loading bar pieces in six (up and down, left and right, and back and forth) directions. By controlling height of the laser beams and a position of the auxiliary centering target on the surface of the bar piece, the levelness and perpendicularity of the bar piece are adjusted. Meanwhile, the lamp source is freely placed on the auxiliary supporting plate of the centering system, the square base is sheathed and fixed on the bar piece from the loading end of the Z− direction bar piece, and the levelness and perpendicularity of X-axis, Y-axis and Z-axis bar pieces are adjusted with the Z− direction bar piece as a perpendicular reference.

Embodiment 2: a dynamic true triaxial electromagnetic Hopkinson bar leveling and centering method comprises the following steps of:

Step 1: determining placing positions of bar pieces of a dynamic true triaxial electromagnetic Hopkinson bar testing system; and roughly placing six bars on a bar piece supporting frame 27 according to a true triaxial stress loading state and a principle that adjacent bar pieces are perpendicular to each other and coaxial bar pieces are centered; wherein, the loading end surface of the Z− direction bar piece 11 is aligned with lower surfaces of the X-axis and Y-axis bar pieces, and the Z+ direction bar piece is suspended on the supporting framework of the testing system to ensure the perpendicularity according to the dead load of the Z+ direction bar piece. A loading end surface of a Z+ direction bar piece 9 is 20 mm or more away from upper surfaces of the X-axis and Y-axis bars. The reason for determining this value is that a height of a horizontal lamp source needs to be adjusted to 10 mm from the upper surfaces of the X/Y-axis bar pieces, and a Z+ direction lamp source is 10 mm higher than the horizontal lamp source.

Step 2: determining a central point of the loading end surface of the bar piece. After the perpendicularity of the Z− direction bar piece 11 is adjusted, it is necessary to find a central point of an end surface of each bar in contact with a sample. Diagonal corners of the loading end surfaces of the six bar pieces are respectively connected, and an intersection point of the two diagonal lines is a central point of the end surfaces, and marked.

Figure 4:
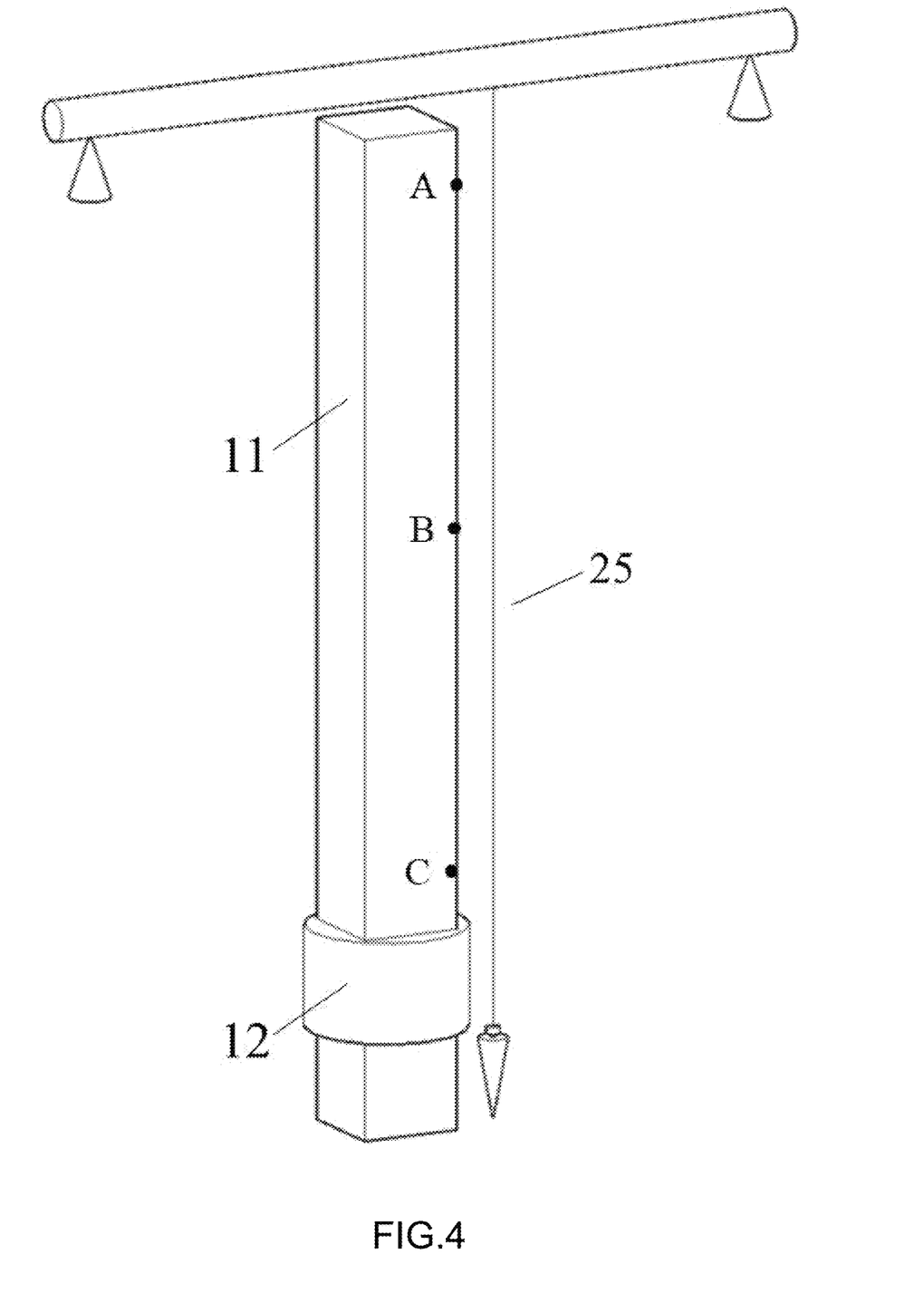
FIG. 4 is a schematic diagram of perpendicular adjustment of a Z− direction bar piece according to the present invention.

Step 3: adjusting perpendicularity of a Z− direction bar piece. Before installing and fixing the centering system, it is necessary to determine the perpendicularity of the Z− direction bar piece 11. One plumb line 25 is erected above the Z− direction bar piece 11, and naturally drops along the bar piece. Points are taken downwards along the Z− direction bar piece 11 according to upper, middle and lower directions, as shown in points A, B and C in FIG. 4. Distances of the points A, B and C from the plumb line 25 are respectively measured with a micrometer, and the distances between the points A, B and C and the plumb line are within a range of 0.02 mm by adjusting the bar piece supporting frame 27 of the Z− direction bar piece 11, thus, the perpendicularity adjustment of the Z− direction bar piece 11 is completed and the bar piece is fixed.

Step 4: assembling the centering system. The supporting base 13 of the centering system shown in FIG. 1 is sheathed from a loading end surface of the Z− direction bar piece 11 to stably contact with the end surface of the bar piece and fixed on the bar piece. Subsequently, the auxiliary supporting plate 17 is installed on the supporting base 13, and the X+ lamp source 18 and the X− lamp source 19 are placed on a groove of the auxiliary supporting plate 17, thus ensuring levelness of the X-axis lamp source and the Y-axis lamp source and perpendicularity of the Z-axis lamp source after the lamp sources stop shaking.

Data reference example: the height of the supporting base 13 is about 30 mm, and a deep of the supporting base 13 sheathed on the Z− direction bar piece 11 is about 25 mm. An overall height adjusting range of the centering system is about 30 mm to 60 mm. It may ensure that the lamp source can at least reach about 5 mm below the central point of the end surface of the bar piece and at most reach about 15 mm above the end surface of the bar piece. The above data is only a test reference based on the current bar piece values, and no specific restrictions are made.

Step 5: adjusting centering of the centering system. According to planes where an X-axis bar piece and a Y-axis bar piece are located, the sliding platform 15 is accurately controlled to slide synchronously (as shown in the schematic diagram of the adjusting principle in FIG. 3) by controlling the micrometer adjusting knob 14 of the centering system to drive the auxiliary supporting plate 17 to adjust the height of the lamp source, such that the X+ lamp source 18, the X− lamp source 19, the Y+ lamp source 20, the Y− lamp source 21 and the Z+ lamp source 22 are projected around the central point of the loading end surface of the bar piece, and the central point of the loading end surface of the bar piece coincides with a projection point of the laser lamp source by adjusting supporting structure of each bar piece.

Figure 6:
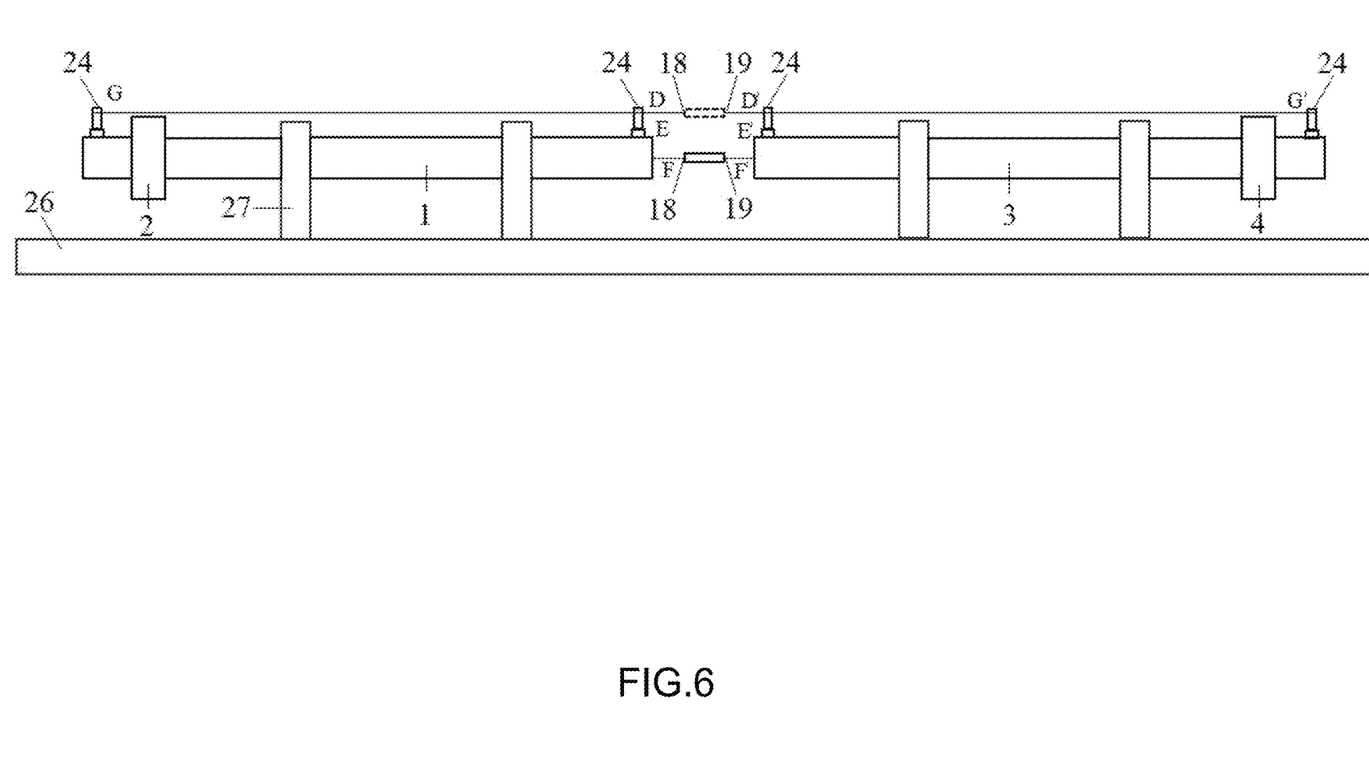
FIG. 6 is a schematic diagram of a principle and method of leveling and centering of a coaxial bidirectional bar piece (taking X-axis as an example)
Figure 7:
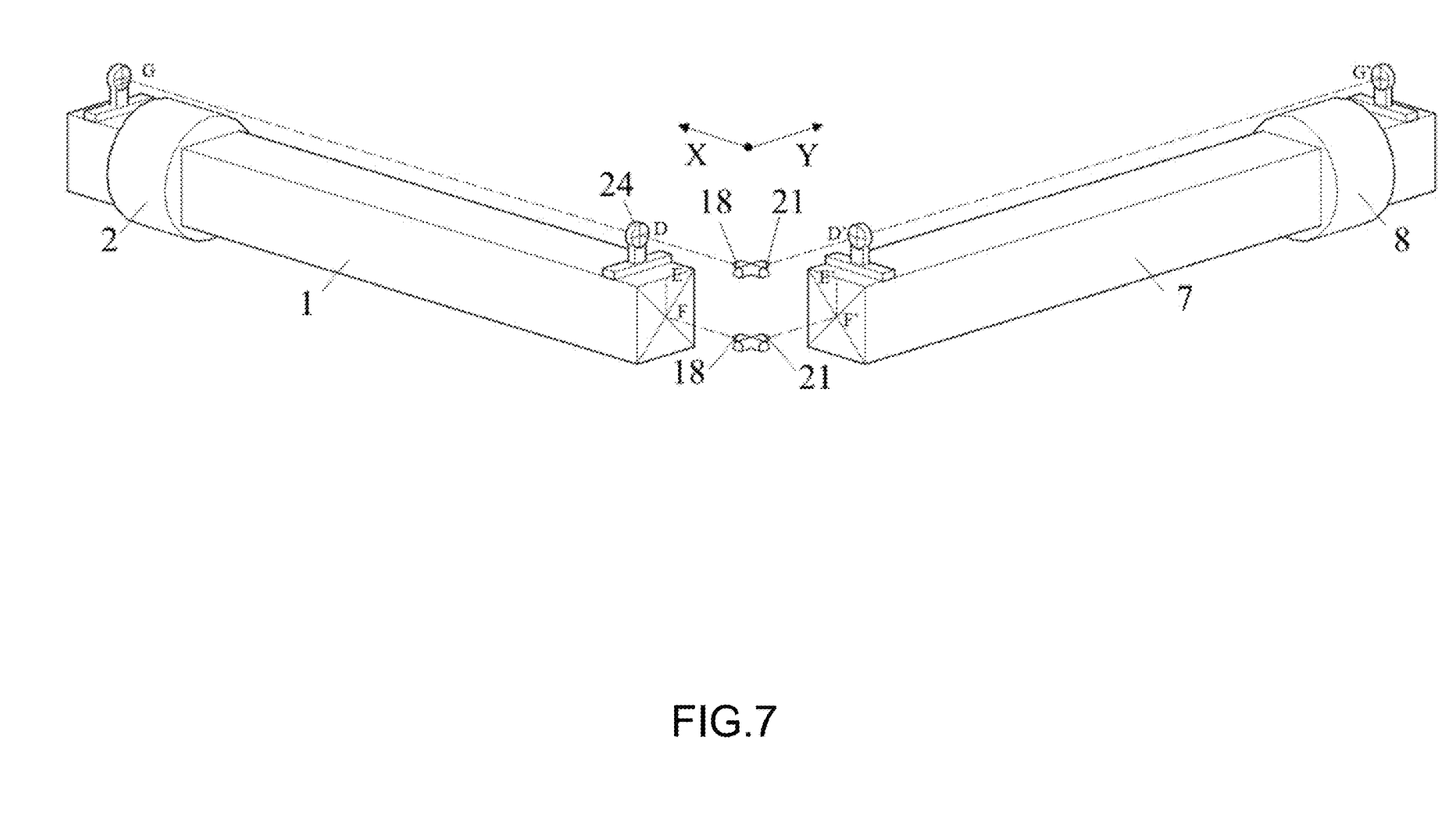
FIG. 7 is a schematic diagram of a principle and a method of perpendicular adjustment of adjacent bar pieces according to the present invention (taking X+ and Y+ as examples)

The centering and leveling method of the X-axis and the Y-axis in a horizontal direction are as follows: taking the X-axis for example, as shown in FIG. 6, when the X+ lamp source 18 and the X− lamp source 19 are at a center of an X-axis end surface, the bar piece supporting frame 27 is adjusted to overlap projection points of the X+ lamp source 18 and the X− lamp source 19 with a central point F of the loading end surface of the X+ direction bar piece and a central point F' of a loading end surface of the X− direction bar piece, thus completing adjusting the centering of the loading end surfaces of the coaxial bar pieces.

The perpendicularity of the Z+ direction bar piece 9 may be adjusted according to the dead load of the Z+ direction bar piece first, then the all-around positions of the Z+ direction bar piece 9 are adjusted according to the projection point of the Z+ lamp source and the central point of the end surface of the bar piece to make the Z+ direction bar piece 9 correspond to a center of the Z− direction bar piece 11.

Figure 5:
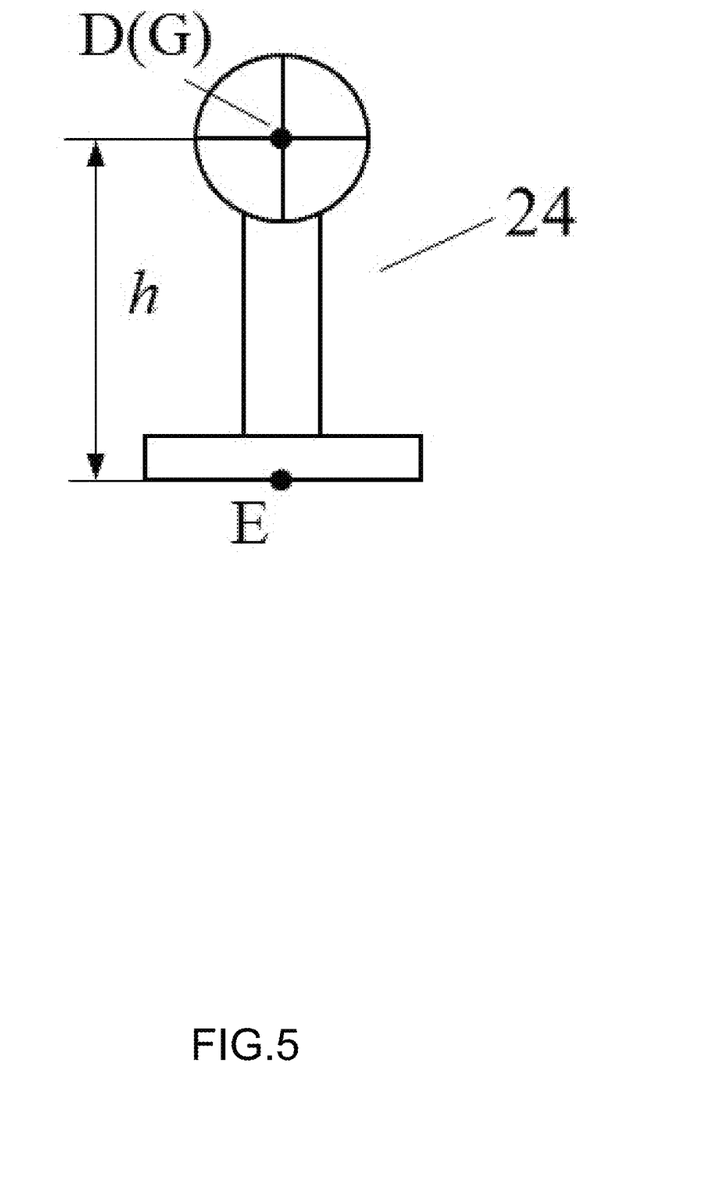
FIG. 5 is a schematic diagram of an auxiliary centering target according to the present invention.

Step 6: adjusting a height of the centering system. After completing the centering and leveling of the X-axis and the Y-axis, the two auxiliary centering targets 24 as shown in FIG. 5 are respectively placed on the X+ direction bar piece 1, for example, placed on the stress wave application end and the loading end contacted with the sample. For another example, the placement positions of the auxiliary centering targets at both ends of each bar piece are about 50 mm away from the end surface. A bottom width of the auxiliary centering target 24 is preferably consistent with a width of the bar piece. The sliding platform 15 and the auxiliary supporting plate 17 of the centering system are adjusted by controlling the micrometer adjusting knob 14 to adjust the heights of the X+ lamp source 18 and the X− lamp source 19. Lamp source points are projected to a central point D of the auxiliary centering target 24 near the loading end of the bar piece, and then up, down, left and right positions of the bar piece are adjusted by controlling the bar piece supporting frame 27 to enable a laser beam to be projected to a central point G of the auxiliary centering target at the loading end of the bar piece through the central point D of the auxiliary centering target at the loading end of the bar piece. According to a principle that two points form one line, it is deemed that the leveling and centering of the X+ direction bar piece 1 are completed, and the X+ direction bar piece 1 is fixed.

The leveling and centering of an X− direction bar piece 3, a Y+ direction bar piece 5 and a Y− direction bar piece 7 are completed by using the same method.

Figure 8:
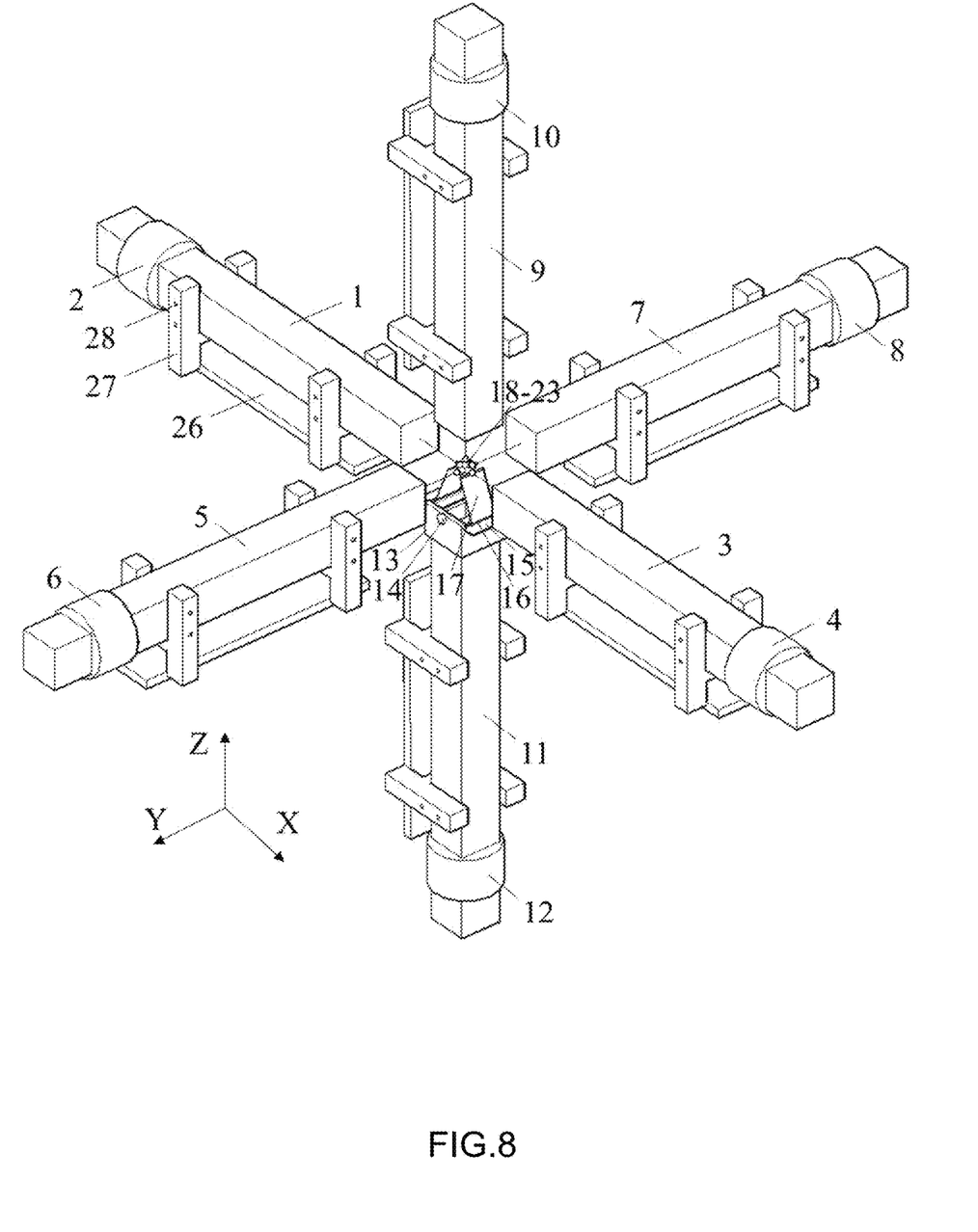
FIG. 8 is a schematic diagram of centering and leveling a true triaxial bar piece according to the present invention.

Perpendicularity of the Z+ direction bar piece 9 is automatically adjusted according to a dead load of the Z+ direction bar piece 9 as the Z+ direction bar piece 9 is suspended on a loading framework of the dynamic true triaxial electromagnetic Hopkinson bar testing system, all-around positions of the Z+ direction bar piece 9 are controlled by adjusting the bar piece supporting frame 27 with the Z− direction bar piece 11 as a reference, so that a central point of a loading end surface of the Z+ direction bar piece 9 coincides with a projection point of the laser lamp, thus completing adjusting centering of the Z+ direction bar piece 9. Centering and leveling of a triaxial six-direction bar piece can be completed according to the above method.

The foregoing are further detailed descriptions of the present invention with reference to the specific preferred embodiments, and it should not be considered that the embodiments of the present invention are limited to these descriptions. For those having ordinary skills in the art, some simple deduction or replacement can be made without departing from the concept of the present invention, which shall all be included within the scope of protection of the present invention.

What is claimed is:

1. A dynamic true triaxial electromagnetic Hopkinson bar leveling and centering system, comprising a supporting base (13), a micrometer adjusting knob (14), a sliding platform (15), an auxiliary supporting plate (17), a fixing groove (16), at least two auxiliary centering targets (24) and a lamp source, wherein the lamp source comprises an X+ lamp source (18), an X− lamp source (19), a Y+ lamp source (20), a Y− lamp source (21), a Z+ lamp source (22) and a Z− lamp source (23), the six lamp sources are a whole structure, the adjacent lamp sources are perpendicular to each other and coaxially centered with each other, and all the six lamp sources are laser lamp sources; a side length of an inner cavity of the supporting base (13) of the dynamic true triaxial electromagnetic Hopkinson bar leveling and centering system is slightly larger than a size of the bar piece, and the lamp source is in free and non-fixed connection with the auxiliary supporting plate (17); and one end of the auxiliary supporting plate (17) is placed in the fixing groove (16), the other end of the auxiliary supporting plate (17) supports the X+ lamp source (18) and the X− lamp source (19), and the sliding platform (15) is driven to move by rotating the micrometer adjusting knob (14) to adjust a height of the lamp source.

2. A dynamic true triaxial electromagnetic Hopkinson bar leveling and centering method, wherein the dynamic true triaxial electromagnetic Hopkinson bar leveling and centering system according to claim 1 is utilized to perform leveling and centering of the bar piece, comprising the following steps of:

Step 1: determining placing positions of bar pieces of a dynamic true triaxial electromagnetic Hopkinson bar testing system, and roughly placing six bars on a bar piece supporting frame (27) according to a true triaxial stress loading state and a principle that adjacent bar pieces are perpendicular to each other and coaxial bar pieces are centered;

Step 2: determining a central point of the loading end surface of the bar piece;

Step 3: adjusting perpendicularity of a Z− direction bar piece;

Step 4: assembling the dynamic true triaxial electromagnetic Hopkinson bar leveling and centering system, sheathing the supporting base (13) of the dynamic true triaxial electromagnetic Hopkinson bar leveling and centering system from a loading end surface of the Z− direction bar piece (11) to stably contact with the end surface of the bar piece and fixing the supporting base (13) of the dynamic true triaxial electromagnetic Hopkinson bar leveling and centering system on the bar piece; and subsequently, installing the auxiliary supporting plate (17) on the supporting base (13), and placing the X+ lamp source (18) and the X− lamp source (19) on a groove of the auxiliary supporting plate (17), thus ensuring levelness of the X-axis lamp source and the Y-axis lamp source and perpendicularity of the Z-axis lamp source after the lamp sources stop shaking;

Step 5: adjusting centering of the dynamic true triaxial electromagnetic Hopkinson bar leveling and centering system: according to planes where an X-axis bar piece and a Y-axis bar piece are located, accurately controlling the sliding platform (15) to slide synchronously by controlling the micrometer adjusting knob (14) of the dynamic true triaxial electromagnetic Hopkinson bar leveling and centering system to drive the auxiliary supporting plate (17) to adjust the height of the lamp source, such that the X+ lamp source (18), the X− lamp source (19), the Y+ lamp source (20), the Y− lamp source (21) and the Z+ lamp source (22) are projected around the central point of the loading end surface of the bar piece, and the central point of the loading end surface of the bar piece coincides with a projection point of the laser lamp source by adjusting supporting structure of each bar piece; and Step 6: adjusting a height of the dynamic true triaxial electromagnetic Hopkinson bar leveling and centering system: after the centering and the leveling of the X-axis and the Y-axis are completed, respectively placing the two auxiliary centering targets (24) at a stress wave application end on an X+ direction bar piece (1) and a loading end contacted with a sample, adjusting the sliding platform (15) and the auxiliary supporting plate (17) of the dynamic true triaxial electromagnetic Hopkinson bar leveling and centering system by controlling the micrometer adjusting knob (14), adjusting the heights of the X+ lamp source (18) and the X− lamp source (19), and projecting the X+ lamp source (18) and the X− lamp source (19) to a central point D of the auxiliary centering target (24) near the loading end of the bar piece, and then adjust up, down, left and right positions of the X+ direction bar piece by controlling the bar piece supporting frame (27) to enable a laser beam to be projected to a central point G of the auxiliary centering target at the stress wave application end of the bar piece through the central point D of the auxiliary centering target at the loading end of the bar piece, and fixing the X+ direction bar piece (1); and completing the leveling and centering of an X− direction bar piece (3), a Y+ direction bar piece (5) and a Y− direction bar piece (7) by using the same method;

wherein, perpendicularity of a Z+ direction bar piece (9) is automatically adjusted according to a dead load of the Z+ direction bar piece (9) as the Z+ direction bar piece (9) is suspended on a loading framework of the dynamic true triaxial electromagnetic Hopkinson bar testing system, all-around positions of the Z+ direction bar piece (9) are controlled by adjusting the bar piece supporting frame (27) with the Z− direction bar piece (11) as a reference, so that a central point of a loading end surface of the Z+ direction bar piece (9) coincides with a projection point of the laser lamp, thus completing adjusting centering of the Z+ direction bar piece (9); and centering and leveling of a triaxial six-direction bar piece is completed according to the above method.

3. The dynamic true triaxial electromagnetic Hopkinson bar leveling and centering method according to claim 2, wherein in Step 1, the loading end surface of the Z− direction bar piece (11) is aligned with lower surfaces of the X-axis and Y-axis bar pieces, and the Z+ direction bar piece is suspended on the supporting framework of the dynamic true triaxial electromagnetic Hopkinson bar testing system to ensure the perpendicularity according to the dead load of the Z+ direction bar piece.

4. The dynamic true triaxial electromagnetic Hopkinson bar leveling and centering method according to claim 2, wherein in Step 2, diagonal corners of the loading end surfaces of the six bar pieces are respectively connected, and an intersection point of the two diagonal lines is a central point of the end surfaces, and marked.

5. The dynamic true triaxial electromagnetic Hopkinson bar leveling and centering method according to claim 2, wherein in Step 3, before installing and fixing the dynamic true triaxial electromagnetic Hopkinson bar leveling and centering system, it is necessary to determine the perpendicularity of the Z− direction bar piece (11), wherein one plumb line (25) is erected above the Z− direction bar piece (11), and naturally drops along the bar piece, points are taken downwards along the Z− direction bar piece (11) according to upper, middle and lower directions, distances of points A, B and C from the plumb line (25) are respectively measured with a micrometer, and the distances between the points A, B and C and the plumb line are within the same numerical range by adjusting the bar piece supporting frame (27) of the Z− direction bar piece (11), thus, the perpendicularity adjustment of the Z− direction bar piece (11) is completed and the bar piece is fixed.

6. The dynamic true triaxial electromagnetic Hopkinson bar leveling and centering method according to claim 2, wherein in Step 5, the centering and leveling method of the X-axis and the Y-axis in a horizontal direction are as follows: for the X-axis, when the X+ lamp source (18) is at a center of an X-axis end surface, the bar piece supporting frame (27) is adjusted to overlap a projection point of the X+ lamp source (18) with a central point F of the loading end surface of the X+ direction bar piece, thus completing adjusting the centering of the loading end surface of the X+ direction bar piece; and for the Y-axis, when the Y+ lamp source (20) is at a center of a Y-axis end surface, the bar piece supporting frame (27) is adjusted to overlap a projection point of the Y+ lamp source (20) with a central point of the loading end surface of the Y+ direction bar piece, thus completing adjusting the centering of the loading end surface of the Y+ direction bar piece.

7. The dynamic true triaxial electromagnetic Hopkinson bar leveling and centering method according to claim 2, wherein in Step 5, the perpendicularity of the Z+ direction bar piece (9) is adjusted according to the dead load of the Z+ direction bar piece (9) first, then the all-around positions of the Z+ direction bar piece (9) are adjusted according to the projection point of the Z+ lamp source and the central point of the end surface of the bar piece to make the Z+ direction bar piece (9) correspond to a center of the Z− direction bar piece (11).

8. The dynamic true triaxial electromagnetic Hopkinson bar leveling and centering method according to claim 2, wherein in Step 6, a bottom width of the auxiliary centering target (24) is consistent with a width of the bar piece.

9. The dynamic true triaxial electromagnetic Hopkinson bar leveling and centering method according to claim 2, wherein two auxiliary centering targets (24) are placed on each bar piece at the same time.

* * * * *